US010746564B2

(12) United States Patent
Gregory

(10) Patent No.: US 10,746,564 B2
(45) Date of Patent: Aug. 18, 2020

(54) INERTIAL SENSOR

(71) Applicant: Atlantic Inertial Systems Limited, Plymouth, Devon (GB)

(72) Inventor: Christopher Gregory, Plymouth (GB)

(73) Assignee: ATLANTIC INERTIAL SYSTEMS, LIMITED, Plymouth, Devon (GB)

( * ) Notice: Subject to any disclaimer, the term of this patent is extended or adjusted under 35 U.S.C. 154(b) by 150 days.

(21) Appl. No.: 15/751,999

(22) PCT Filed: Aug. 5, 2016

(86) PCT No.: PCT/GB2016/052439
§ 371 (c)(1),
(2) Date: Feb. 12, 2018

(87) PCT Pub. No.: WO2017/025726
PCT Pub. Date: Feb. 16, 2017

(65) Prior Publication Data
US 2018/0238710 A1 Aug. 23, 2018

Related U.S. Application Data

(60) Provisional application No. PCT/GB2016/052439, filed on Aug. 5, 2016.

(30) Foreign Application Priority Data

Aug. 12, 2015 (GB) .................................. 1514321.7

(51) Int. Cl.
*G01C 25/00* (2006.01)
*G01P 21/00* (2006.01)
(Continued)

(52) U.S. Cl.
CPC ........... *G01C 25/005* (2013.01); *G01C 21/16* (2013.01); *G01P 15/0922* (2013.01);
(Continued)

(58) Field of Classification Search
CPC ........ G01P 21/00; G01P 15/125; G01P 15/18; G01P 15/123; G01P 15/0922
(Continued)

(56) References Cited

U.S. PATENT DOCUMENTS 3,688,099 A * 8/1972 Buscher ............... G05D 1/0077
714/11
3,732,501 A * 5/1973 Fischer, Jr. ............. G05B 9/03
330/1 A
(Continued)

FOREIGN PATENT DOCUMENTS

CN 102494699 A 6/2012
EP 0511730 A2 * 11/1992 ............. G01C 21/16
(Continued)

OTHER PUBLICATIONS

Wen et al., Accuracy Estimation for Sensor Systems, IEEE Tranactions on Mobile Computing, vol. 14 No. 7, Jul. 2015. pp. 1330-1343 (Year: 2015).*
(Continued)

*Primary Examiner* — Clayton E. LaBalle
*Assistant Examiner* — Kevin C Butler
(74) *Attorney, Agent, or Firm* — Cantor Colburn LLP

(57) ABSTRACT

A method of determining whether parametric performance of an inertial sensor has been degraded comprises: recording first data output from an inertial sensor; then recording second data output from the inertial sensor; comparing the first data output with the second data output; and determining whether the parametric performance of the inertial sensor has been degraded based on the comparison between the first and second data output.

20 Claims, 4 Drawing Sheets

(51) Int. Cl.
   G01C 21/16    (2006.01)
   G01P 15/18    (2013.01)
   G01P 15/09    (2006.01)
   G01P 15/125   (2006.01)
   G01P 15/12    (2006.01)

(52) U.S. Cl.
   CPC .......... *G01P 15/123* (2013.01); *G01P 15/125* (2013.01); *G01P 15/18* (2013.01); *G01P 21/00* (2013.01)

(58) Field of Classification Search
   USPC ......................................................... 73/1.38
   See application file for complete search history.

(56) References Cited

U.S. PATENT DOCUMENTS

| | | | | |
|---|---|---|---|---|
| 4,095,763 | A * | 6/1978 | Builta ............... | G05D 1/0077 244/194 |
| 4,117,317 | A * | 9/1978 | Dooley, Jr. ......... | G05B 19/054 700/7 |
| 2002/0016692 | A1 | 2/2002 | Langmeier et al. | |
| 2005/0197769 | A1 | 9/2005 | Soehren et al. | |
| 2008/0046213 | A1* | 2/2008 | Fregene ............. | G01C 21/16 702/116 |
| 2009/0326851 | A1* | 12/2009 | Tanenhaus .......... | G01C 21/16 702/96 |
| 2015/0153220 | A1* | 6/2015 | Quer ................. | G01P 15/097 73/579 |
| 2017/0168087 | A1* | 6/2017 | Gafforelli .......... | G01P 21/00 |

FOREIGN PATENT DOCUMENTS

| | | | | |
|---|---|---|---|---|
| EP | 0511730 | A2 | 11/1992 | |
| GB | 2070808 | * | 2/1981 | .............. G05D 1/08 |
| GB | 2070808 | A | 9/1981 | |
| GB | 2541220 | * | 2/2017 | .............. G01C 21/16 |
| JP | H05273232 | * | 10/1993 | .............. G01P 21/00 |
| JP | H05273232 | A | 10/1993 | |
| JP | H07198733 | A | 8/1995 | |
| WO | 2013074497 | A1 | 5/2013 | |
| WO | WO-2013074497 | A1 * | 5/2013 | .............. B60W 50/02 |

OTHER PUBLICATIONS

Ma, Parametric and Nonparametric Approaches for Multisensor Data Fusion, The University of Michigan Electrical Engineering, 2001, pp. 1-171 (Year: 2001).*

Yazidi, On Solving the Problem of Identifying Ureliable Sensors . . . , Proceedings of IEEE/WIC '15, the 2015 International Conference on Web Intelligence and Intelligent Agent Technology, Singapore, Dec. 2015, pp. 1-27 (Year: 2015).*

Vedat Ekütekin, Navigation and Control Studies on Cruise Missiles, A Thesis Submitted to the Graduate School of Natural and Applied Sciences of Middle East Technical University, Jan. 2007, 298 pages (Year: 2007).*

Department of Defense, Ballistic Missile Defense Glossary Version 3.0, Pentagon, Washington D.C., Jul. 17, 1997, 319 pages (Year: 1997).*

Data Binning: Wikipedia: Retrieved from the internet:,URL: https://en.wikipedia.org/w/index.php?title=Data_binning&oldid=581025696, 2 pages.

Intellectual Property Office Search Report for International Application No. GB1514321.7 dated Jan. 22, 2016, 5 pages.

PCT International Search Report and Written Opinion for International Application No. PCT/GB2016/052439 dated Dec. 12, 2016, 18 pages.

Window Function: Wikipedia: Retrieved from the internet:,URL: https://en.wikipedia.org/w/index.php?title=Window_function&oldid=666961071; 32 pages.

JP Office Action for Patent Application No. JP 2018-507633, dated Nov. 19, 2019, 2 pages.

European Official Letter for Application No. 16750236.8, dated Mar. 13, 2020, 73 pages.

* cited by examiner

INERTIAL SENSOR

CROSS REFERENCE TO RELATED APPLICATIONS

This is a US National Stage of Application No. PCT/GB2016/052439, filed on Aug. 5, 2016, which claims the benefit of GB Application No. 1514321.7, filed Aug. 12, 2015, the disclosures of which are incorporated herein by reference.

The present disclosure relates to the field of inertial sensors. Specifically, it relates to a method whereby data output from an inertial sensor is used to detect any disturbances which may affect the performance of the sensor.

Inertial sensors are used, for example, in inertial measurement units (IMUs) in order to measure the acceleration and/or angular rate of the host device. The host device is the device in/on which the IMU is located. IMUs typically contain a number of inertial sensors, e.g. three accelerometers to measure acceleration in three orthogonal directions, and three gyros to measure angular rate (roll, pitch and yaw, respectively). The accelerometers could be, for example, MEMS (microelectromechanical) accelerometers, and the gyros could be, for example, MEMS gyros, fibre optic gyros (FOGs) or laser gyros.

IMUs are often used on missiles for guidance and navigation. Other examples of where IMUs are used may include land vehicles (e.g. military land vehicles) and maritime or underwater vehicles.

In the case of missiles, typically, before a missile is launched from an aircraft, a transfer alignment process (referred to as a "transfer align") is performed in order to determine the missile IMU's inertial parametric errors so that the effect of such errors may be allowed for and thereby minimised during operation after launch. Parametric errors may arise, for example, from the demanding mechanical vibration environment in which the IMU is located. A transfer align is usually performed by comparing parametric outputs from the missile IMU (which usually contains MEMS accelerometers and gyros) with an IMU on the aircraft itself (which usually contains a more accurate inertial sensing system).

This process of optimising the performance of the missile IMU can only be performed prior to launch, i.e. whilst the missile is still attached to the aircraft. This is referred to as a "captive carry" environment. The captive carry environment will have an associated vibration profile that causes parametric variation in the inertial sensors due to vibration sensitivities of the gyroscopes and accelerometers. The vibration rectification error (VRE) is a primary error driver in this environment. (The VRE is the change in gyroscope or accelerometer bias error as a function of an applied vibration. The gyroscope or accelerometer bias error is the output signal reported by a gyro when it is not experiencing any rotation or by an accelerometer when it is not experiencing any acceleration, respectively.)

However, after launch, the missile will experience both a release from the aircraft and a change in the vibration profile whilst in free flight, which is driven primarily by the characteristics of the missile structure and the rocket motor. Both of these factors can alter the environmental vibration profile of the IMU.

FIG. 6 is a schematic diagram illustrating the main components inside a missile 10.

As shown in FIG. 6, an IMU 11 is typically located near the centre of the missile 10, behind a seeker 14 (in the front of the missile 10) and in front of a rocket motor 16. A host system computer 15, containing a navigation system, is usually located in close proximity to the IMU 11. The IMU 11 contains one or more (usually six, as described above) inertial sensors. In some cases, the missile 10 also contains a GPS (Global Positioning System) system 12. A warhead and fuse 13 and an actuation system 17 are also provided. The actuation system 17 is used to control the missile aerodynamics in order to achieve the desired flight path of the missile 10. For example, this could involve controlling the angle of fins or canards, the rocket motor exhaust angle, etc.

As indicated by the arrows in FIG. 6, the host system computer 15 receives signals/data from the seeker 14, the IMU 11, and the GPS system 12. The host system computer 15 also sends signals/data to the actuation system 17, the warhead and fuse 13, the rocket motor 16 and the seeker 14. In some cases, the host system computer 15 can also send signals to the IMU 11 and the GPS system 12.

The navigation system provided on the host computer 15 usually uses a Kalman Filter (KF) to observe and compensate for the inertial parametric errors. The KF continually monitors inputs from the inertial sensors in the IMU 11 and any other available sensors or navigation inputs (e.g. the GPS system 12, feature tracking from optical or infrared sensors, terrain profile matching from LIDAR or RADAR sensors, altitude estimates from barometric sensors, or azimuth measurements from magnetic compasses) to estimate navigation state parameters, such as position and pointing angle, and parametric error states of the inertial sensors in the IMU 11. These estimates are generated through an understanding of the relationship between each input and the error states of the system, and a weighting algorithm based on the confidence in the errors associated with each input.

Typically, the KF is initialised with appropriate estimates for the likely error states and random noise characteristics for the inertial sensors in order to optimise navigation performance. During steady environmental conditions, this is generally a successful approach. However, during a shock event or a rapid change in external vibration profile, the KF will experience a period of divergence as the inertial sensors output rapid changes in parametric errors due to the change in environment. Consequently, the navigation errors of the system increase significantly during such environmental changes. Events which could cause this to happen include the missile entering turbulent air space, changes in the resonance of the missile flexure modes due to rocket fuel consumption or dynamic manoeuvres, and deployment of canards causing a shock event, The majority of IMUs incorporate a Built In Test (BIT), the result of which is passed to the host system to flag any catastrophic failure of a particular inertial data channel (i.e. the data output from one inertial sensor). Thus, the BIT indicates when there is a hard fault with an inertial sensor and the corresponding inertial sensor may then be excluded from the KF and not used for navigation. Specifically, during operation, the IMU is continually outputting inertial sensor information (i.e. three angular rates from the roll, pitch and yaw gyros, respectively, and three orthogonal accelerations from the three accelerometers, respectively) and includes the BIT status as part of its output message. This message is continually outputted at a rate of 200 Hz (typically) up to 2000 Hz (depending on the requirements for the particular missile system) to the host system computer. The BIT status is usually a hexadecimal code with a 0 or 1 associated with each key component, such as Gyro 1, Gyro 2, etc. The message would be all 1s if all components were working, and only show a 0 during a component failure event.

By flagging catastrophic failure of any inertial data channels (inertial sensors) using the BIT in this way, this enables the host system to respond appropriately by aborting the mission or taking some other remedial action. This is standard practice in the industry and is a crude reliability indicator from the IMU.

However, as described above, there will be times (e.g. during a shock event or a rapid change in the external vibration profile) when all inertial channels of the IMU are still functioning correctly (i.e. there is no hard failure and they are not broken as such) but their performance has been degraded (i.e. the parameters output by the inertial sensor(s) are inaccurate). For example, external events such as sudden shock events may cause a degradation in the accuracy of the parameters output by an inertial sensor, even if there is no actual hard failure in the sensor.

The present disclosure seeks to provide an indication of such situations, where the performance of one or more inertial sensors has been degraded. This may then be used, for example by a KF, in order to improve the guidance and navigational performance of a missile or other device in which the inertial sensor is located.

According to a first aspect of the disclosure, there is provided a method of determining whether parametric performance of an inertial sensor has been degraded comprising: recording first data output from an inertial sensor; then recording second data output from the inertial sensor; comparing the first data output with the second data output; and determining whether the parametric performance of the inertial sensor has been degraded based on the comparison between the first and second data output.

By comparing data output from an inertial sensor with data output at an earlier time, it is possible to detect events such as shock events which may degrade the performance of the inertial sensor, and/or the performance of other inertial sensors contained in the same device.

The term "parametric performance" refers to the accuracy with which the inertial sensor can determine its measured parameter(s), such as acceleration, in the case of the inertial sensor being an accelerometer, or angular rate (i.e. roll, pitch or yaw), in the case of the inertial sensor being a gyro.

Estimates of various parametric errors may also be output from an inertial sensor including, for example, any or all of: gyroscope bias error, accelerometer bias error, scale factor error, scale factor non-linearity, scale factor asymmetry, misalignment, angle random walk, velocity random walk, VRE, gyroscope g-sensitivity (see below for definitions; VRE is defined above). These error estimates may then be used, for example by a navigation system in a host computer (e.g. in a KF), to improve the guidance and navigation of the missile. The estimation of any or all of these errors could be affected or degraded by an event such as a shock event, and this would then in turn affect the performance of the navigation system.

Gyroscope bias error is the output signal reported by a gyro when it is not experiencing any rotation.

Accelerometer bias error is the output signal reported by an accelerometer when it is not experiencing any acceleration.

Scale factor is the ratio of the change in output to a change in the true input. It is estimated as the gradient of a best fit straight line to a graph of output plotted against input. Scale factor error refers to the deviation of the scale factor line from the ideal scale factor line (which would have a gradient of exactly 1). Scale factor non-linearity may be expressed as the maximum deviation from the scale factor best fit straight line divided by the half range. Scale factor asymmetry is the measure of the difference in scale factor over the positive and negative input ranges.

Misalignment is the angle between an IMU axis and its associated reference axis.

Angle random walk is the angular error build-up with time that is due to white noise in the measured angular rate.

Velocity random walk is the velocity error build-up with time that is due to white noise in the measured accelerometer signal.

Gyroscope g-sensitivity is the change in gyroscope bias as a function of an applied linear acceleration level.

The first and second data output are preferably in the form of first and second frequency profiles, respectively (e.g. noise or vibration profiles). Thus, preferably, the method comprises performing frequency analysis of the first and second data output to provide first and second frequency profiles, respectively. The step of comparing the first data output with the second data output then preferably comprises comparing the first frequency profile with the second frequency profile.

If there is a large difference between the two frequency profiles then this may suggest that the parametric performance of the inertial sensor, or other inertial sensors contained in the same device, may be degraded and this can then be accounted for in any subsequent use of the inertial sensors' parametric data.

The inertial sensor may be an accelerometer or a gyro.

The inertial sensor(s) used to determine whether or not performance (of these and/or other inertial sensors contained in the same system) has been degraded is (are) preferably accelerometer(s). This is because, typically, the frequency (vibration) profile(s) of interest (i.e. those from which shock events, for example, are more easily detected) is(are) more readily observed in the accelerometer outputs, so these are the expected sensors of interest. However, gyros could also or alternatively be used. In the case of gyros being used, these would observe rotational vibrations, whereas accelerometers would observe translational vibrations.

The method may comprise comparing data output from more than one inertial sensor (e.g. where the sensors are contained in the same device), i.e. data output from more than one inertial sensor may be used in the comparison.

For example, an IMU may contain inertial sensors in the form of both accelerometers and gyros. In a preferred example, one or more data outputs (e.g. frequency profiles) obtained from one or more inertial sensors (e.g. accelerometers) are compared in order to determine whether the parametric performance of one or any or all of the inertial sensors (e.g. accelerometers and/or gyros) has been degraded.

It is possible that vibration (e.g. caused by a shock event) might occur primarily in a single axis, in which case a separate determination of whether or not performance has been degraded could provided for each axis or accelerometer separately. This could be done by performing the method of the disclosure separately for each accelerometer, for example, where each accelerometer measures vibration in a different, orthogonal axis.

In some examples, more than two data outputs (e.g. frequency profiles) (i.e. from the same inertial sensor) may be compared in order to determine whether performance has been degraded. In some cases, more than two frequency profiles from the same inertial sensor are compared. For example, where frequency profiles are used in the comparison, they may include a windowed filter in time, e.g. across regular frequency profiles and, for example, looking at variation across all the profiles in that window. The window could, for example, contain frequency profile snapshots taken every second, for example, across a 10 second window. In order to compare the plural frequency profiles, earlier profiles could be weighted (normalised) to the most recent profile(s). Comparison metrics could be used for comparing plural frequency profiles.

As described above, more than two data outputs (e.g. frequency profiles) may be included in the comparison or statistical evaluation. In some examples, consecutive data outputs may be compared across a number of data outputs, and, for example, the deltas of these fed into an overall statistical result. Alternatively, all windowed frequency profiles could be evaluated together, e.g. by taking a range or RMS for each frequency bin for all the profiles.

Each frequency profile is preferably provided after high frequency sampling has been performed on the data output from the inertial sensor. This is because the high frequency data can provide a better indication of any shock or vibration events than lower frequency data. The sampling frequency may depend on the location and situation in which the inertial sensor is being used. For example, in the case of missiles, a sampling frequency of around 6 kHz could be used. Typical vibration frequencies for a missile environment, for example, range from around 10 Hz to around 3 kHz. A sampling frequency from an inertial sensor with suitably high bandwidth at 6 kHz would provide visibility of frequencies up to 3 kHz (i.e. the Nyquist frequency for this sampling rate). This is a higher frequency than that typically required by an IMU, which is generally up to around a maximum of 2 kHz.

Preferably, the method comprises performing spectral analysis on the frequency profiles before they are compared. The spectral analysis could be any digital or analogue spectral analysis technique. In a preferred example, performing spectral analysis comprises performing a Fourier transform such as a Fast Fourier Transform (FFT) on the frequency profiles.

The data output from the inertial sensor may be in the form of either an analogue or a digital signal. Digital output signals may be readily analysed with a FFT, for example. However, if the output from the inertial sensor is an analogue signal, then this could undergo analogue-to-digital conversion and then be analysed, or it could be processed as analogue in, for example, an ASIC (application specific integrated circuit) which could have its own spectral analysis capability.

Performing spectral analysis on the frequency profiles can make it easier to compare them and determine, for example, whether a shock event has occurred and performance may be degraded.

In a preferred example, the method comprises binning the frequency profiles before the frequency profiles are compared. In other words, the method may comprise creating binned frequency profiles, i.e. a simplified version of each frequency profile using frequency bins, before the frequency profiles are compared. Each frequency bin may contain an average (e.g. mean) power level of the frequency profile for that bin.

The number, and sizing, of the frequency bins used could be determined by how much resolution was required to identify meaningful changes in frequency profiles and/or the computational time associated with the resolution. For example, a typical frequency range of 0 to 3 kHz could be split into 10 Hz to 100 Hz bins, resulting in 300 to 30 bins, respectively.

In cases where a FFT is used, this could output frequency information into bins, the width of each bin being determined by the resolution of the FFT's spectral analysis. This could be adjusted, if needed, to match the desired frequency binning for the comparison directly.

Where a simplified version of each frequency profile has been created using frequency bins, the step of comparing the first frequency profile with the second frequency profile may then further comprise comparing the simplified version of each frequency profile for each frequency bin. This is much simpler and involves less computation than comparing detailed (i.e. un-binned) frequency profiles.

The step of comparing the first frequency profile with the second frequency profile preferably further comprises determining a value indicating a level of change across all frequency bins between the frequency profiles being compared. The value may be a statistical metric such as the root mean square (RMS) of the change of the frequency bins between the first and second frequency profiles, for example. Other statistical metrics that could be used include, for example, the maximum delta across all frequency bins, the mean delta across all bins, weighted means/RMS whereby some specific frequency bins are more heavily weighted than others (perhaps, for example, due to a priori knowledge of the inherent frequency sensitivities of the inertial sensors(s)).

The method preferably comprises determining a parametric confidence indicator (PCI) based on the result of the comparison. A parametric confidence indicator may provide an indication as to how much confidence may be placed on the data (parameters) output by the inertial sensor(s).

More specifically, determining whether the parametric performance of the inertial sensor has been degraded based on the comparison (e.g. between the frequency profiles or data outputs) may comprise determining a PCI based on that comparison. This PCI may then be used, for example, in estimating inertial parameters (e.g. acceleration and/or angular rate), e.g. by a KF.

The value of the PCI may, for example, be determined based on the comparison and a predetermined threshold or set of thresholds. For example, if the value output from the comparison (e.g. the statistical metric) is above/below a particular threshold, the PCI may be ascribed a particular predetermined value.

Alternatively, rather than using a threshold (or set of thresholds), a conversion function could be used to convert the result of the comparison (e.g. the statistical metric) into a PCI.

In either case, the PCI value could be, for example, a value between 0 and 1 (with 0 being no confidence in the inertial sensor output, and 1 being full confidence).

The thresholds and/or the conversion function (which could simply be a linear scaling) could be determined empirically.

The method is preferably performed by a processor in an inertial sensing system which hosts the inertial sensor. The inertial sensing system could be an IMU, for example.

Thus, the inertial sensing system (e.g. IMU) preferably comprises a comparison filter which is arranged to perform the step of comparing the sensor data output.

The inertial sensing system (e.g. IMU) preferably comprises a spectral analyser, such as a FFT, for performing spectral analysis.

The inertial sensing system (e.g. IMU) is preferably arranged to output the result of the comparison, e.g. in the form of a PCI, to a host system computer.

The result of the comparison (e.g. in the form of a PCI) may be used to determine inertial parameters, which are then preferably used to aid navigation and/or guidance of the device hosting the inertial sensing system (e.g. a missile).

As described above, the present disclosure can provide an indication of when inertial sensor performance may have been degraded but the inertial sensor itself is still functioning correctly. In the case of a missile IMU, for example, the output, e.g. in the form of the PCI, may enable the host navigation and flight control system to refine its response to rapid changes in parametric errors in the IMU.

Typically, a KF is employed in the host system to estimate the parametric error states of the IMU, and during a shock event or change in vibration profile, such as experienced when released from captive carry to free flight, these estimates will diverge from the true values causing the filter weightings to be sub-optimal and compromise overall mission success. However, by including the PCI provided by the present disclosure as an input to the KF, the host system can adjust confidence weightings in a more refined and responsive manner, thereby resulting in enhanced performance when exposed to changing mechanical environments such as shock events.

A second aspect of the disclosure relates to an inertial measurement unit comprising at least one inertial sensor and a processor (or processors) or processing means arranged to perform the method described above.

The IMU may comprise one or more accelerometers such as MEMS accelerometers, for example. The IMU preferably comprises three accelerometers which are arranged to measure acceleration in three orthogonal directions.

The IMU may comprise one or more gyros, such as MEMS gyros, FOGs or laser gyros. Preferably, the IMU comprises three gyros for measuring angular rate (i.e. roll, pitch and yaw, respectively).

Typically, in a missile IMU, the IMU may comprise MEMS accelerometers and MEMS gyros.

The IMU preferably comprises a comparison filter which is arranged to perform the step of comparing the sensor data output.

The IMU also preferably comprises a spectral analyser, such as a FFT, for performing spectral analysis.

The IMU is preferably arranged to output the result of the comparison (e.g. a value representing the result of the comparison), e.g. in the form of a PCI, to a host system computer.

A third aspect of the disclosure relates to an inertial navigation system (INS) comprising an IMU as described above.

Preferably, the INS also comprises a GPS or GNSS (Global Navigation Satellite System) module, and/or a KF.

The INS may be arranged to output inertial data and/or a navigation solution, preferably both. This is performed, for example, following an initialisation period when the INS is switched on.

A fourth aspect of the disclosure relates to a missile, aircraft, vehicle or underwater device comprising an IMU or INS as described above.

The present disclosure will now be described in more detail and by way of example only with reference to the accompanying drawings, in which.

Figure 4:
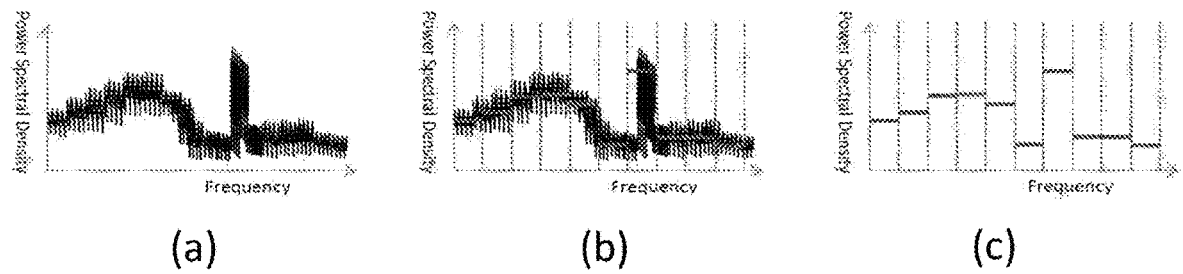
Figure 5:
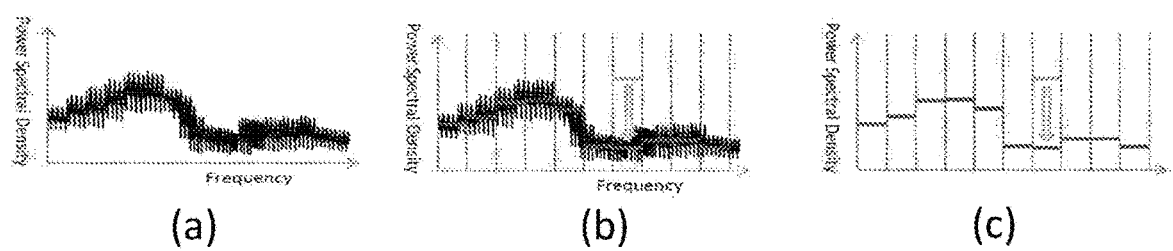
Figure 6:
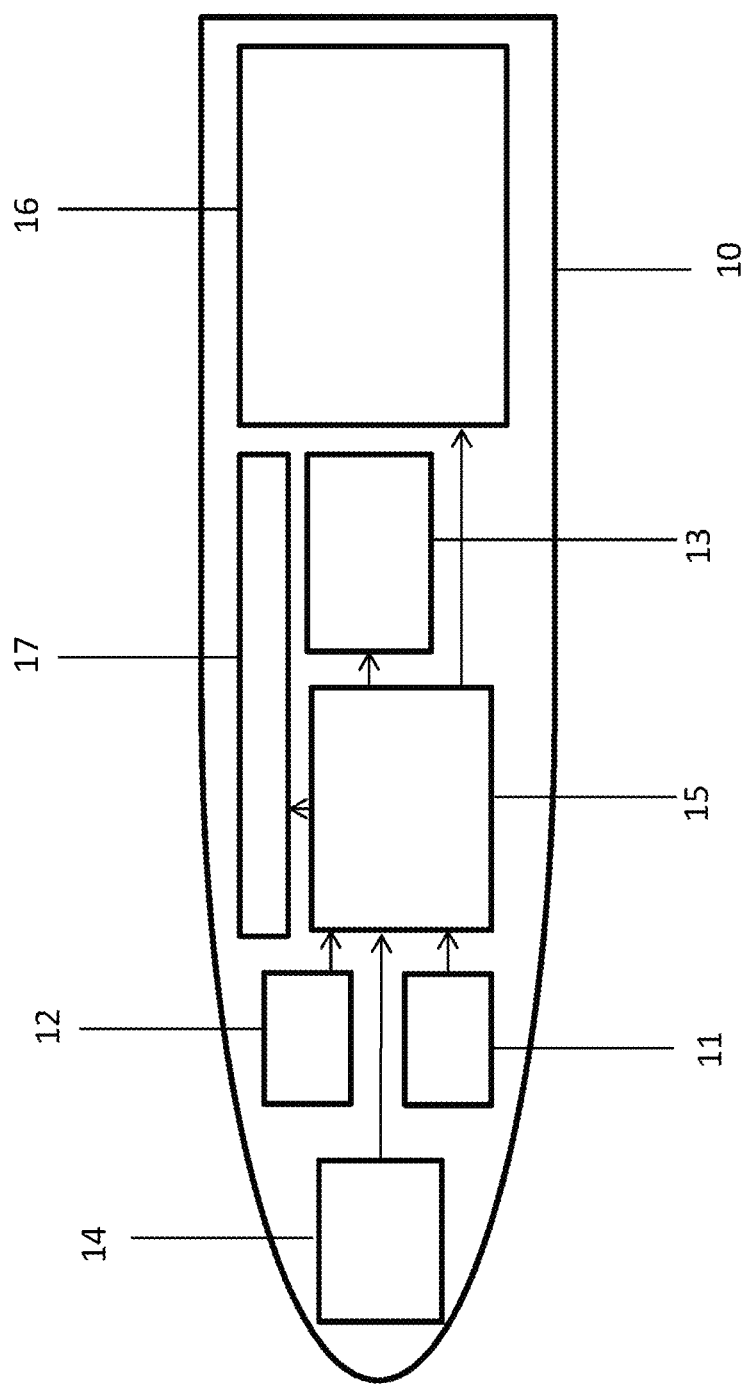

FIGS. 4(*a*)-(*c*) are charts illustrating steps of a method according to an example of the disclosure;

FIGS. 5(*a*)-(*c*) are charts illustrating steps of a method according to an example of the disclosure after a change in conditions; and FIG. 6 is a schematic diagram of a missile containing an IMU.

Figure 1:
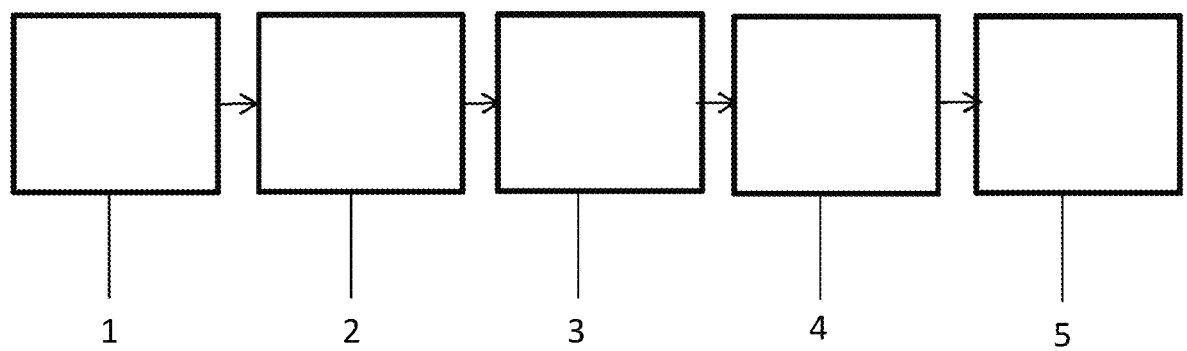
FIG. 1 is a flow diagram illustrating operation of a prior art IMU.

As shown in FIG. 1, in a prior art IMU, accelerometer data 1 from the three accelerometers in an IMU is sampled at high frequencies (~kHz) 2 and the output is filtered by digital filtering 3 to a suitable bandwidth, then decreased to a lower output rate 4, and then output to the host system 5. At the host system, a KF is then applied, where various weightings are applied in order to estimate the inertial parameters. The weightings applied by the KF usually relate to Gyro Bias, Gyro Scale Factor, Accelerometer Bias, Accelerometer Scale Factor and an allowance for random noise errors, which will typically be Angle Random Walk and Velocity Random Walk.

Figure 2:
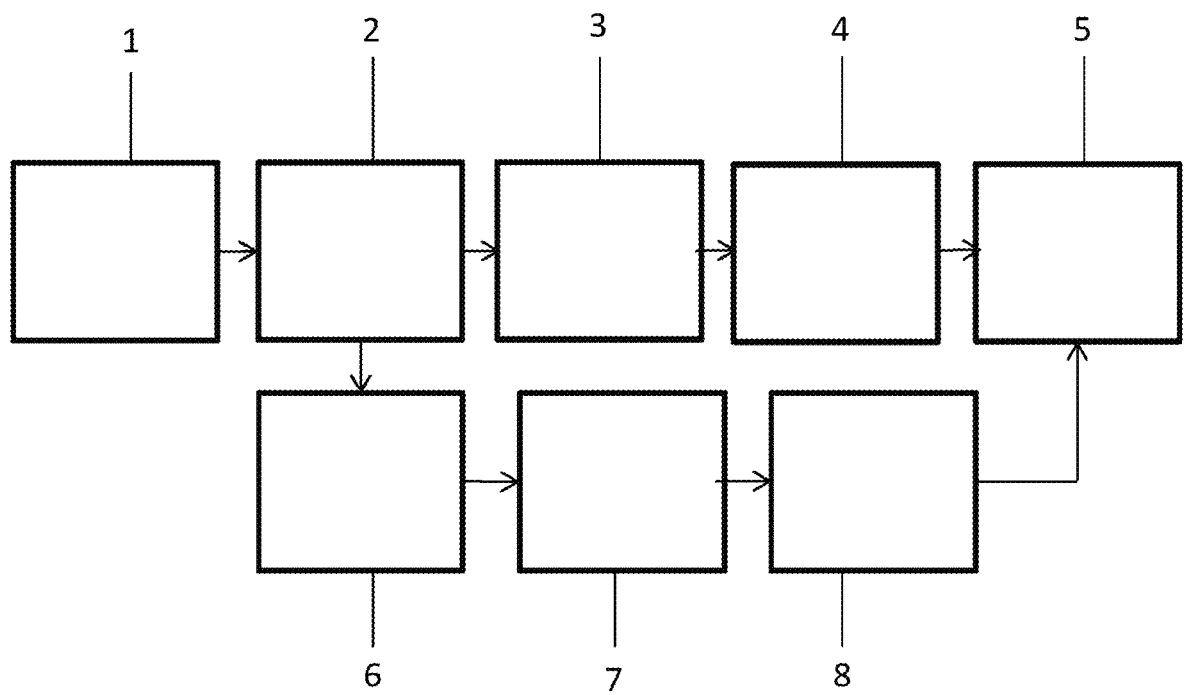
FIG. 2 is a flow diagram illustrating an example of the present disclosure.

In contrast with this, as shown in FIG. 2, which shows an example of the disclosure, the prior art method described above is still performed, but further steps 6, 7, 8 are also performed, in parallel. From these further steps, during exposure to mechanical environmental conditions, such as shock and vibration, information can be acquired from the high frequency output from the inertial sensor(s) to give an indication of how the parametric performance of the IMU is affected by the change in mechanical environment. This information is then output to the host system and used as a further input to the KF, to improve the estimates of the inertial parameters.

Specifically, in these additional steps 6, 7, 8, after the accelerometer data 1 from the three accelerometers has been sampled at high frequencies 2, spectral analysis of the sensor data using a Fast Fourier Transform (FFT) is performed 6 to provide a characterisation of the mechanical environment of the missile when operating in "steady" flight and to further provide the opportunity to identify significant changes to this profile through an event such as mechanical shock or change to the vibration characteristics.

The identification of such significant changes is achieved through use of a comparison filter stage 7 which takes the output of the FFT stage 6 and determines the level of change in the power spectral density for a range of frequency bins. The range of frequency bins is determined empirically through testing and tailored for specific IMUs and applications. Should this spectral content change beyond a given threshold, the state of a PCI is changed at stage 8 and passed to the host system at stage 5.

In an alternative example, rather than using a threshold, a conversion function is used to perform a smooth conversion of the statistic output from the comparison filter to a value between 0 and 1 (with 0 being no confidence in sensor output, and 1 being full confidence).

In some examples, the thresholds and/or the conversion function (which in some examples is simply a linear scaling) are determined empirically. In alternative examples, the thresholds and/or the conversion function is/are set by theoretical analysis.

Figure 3:
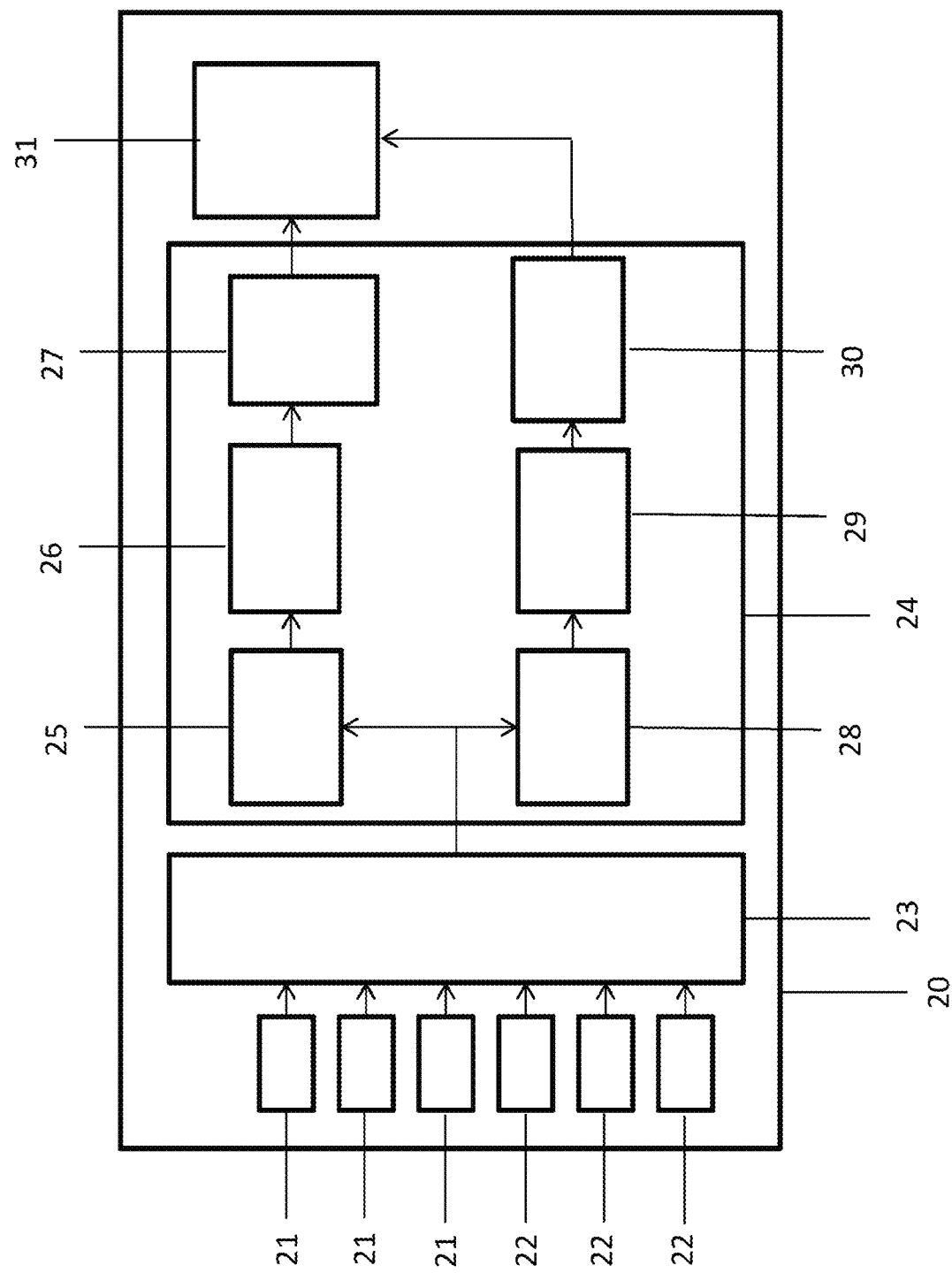
FIG. 3 is a schematic system diagram showing the main components in an IMU according to the present disclosure.

FIG. 3 shows an example of an IMU 20 which is arranged to perform this method. The IMU 20 contains inertial sensors in the form of three gyros 21 and three accelerometers 22. The gyros 21 measure angular rate (roll, pitch and yaw, respectively) and the accelerometers 22 measure acceleration in three orthogonal directions, respectively. The data output from these inertial sensors 21, 22 is then fed into a high frequency sampler 23. If the data output from the sensors 21, 22 is analogue data then, in some examples, the high frequency sampler 23 also includes an ADC (analogue-to-digital converter).

The output from the high frequency sampler 23 is sent to a processor 24.

In the processor 24, the output is sent to a digital filter 25 to filter the output to a suitable bandwidth. The output from this filter is then passed to a parametric compensator 26 which provides parametric compensation to the inertial output based on a calibration performed during production. The data is then passed from the parametric compensator 26 to a rate reducer 27 which lowers the output data to a suitably lower data rate.

In parallel with the steps described in the previous paragraph, the output from the high frequency sampler 23 is also sent to a FFT 28 where the data undergoes spectral analysis. From the FFT 28, the output is passed to a comparison filter 29 which compares the frequency profiles received from the FFT 28 (this is described in more detail below). The result of the comparison filter 29 is then sent to a PCI estimator 30 which determines a value of a PCI from the result of the comparison filter 29.

Finally, the outputs from both the PCI estimator 30 and the rate reducer 27 are formed into an output message 31 which can then be sent to a host system (not shown). A KF in the host system then uses these outputs to estimate inertial parameters (e.g. acceleration and angular rate) which are used in navigation and guidance of the host device (i.e. the device in/on which the IMU is located). More specifically, the host system uses the outputs to optimise confidence weightings that are used in the KF (navigation filter) for the inertial sensor inputs. The KF is already estimating the parametric errors of the inertial sensors. The KF is continually estimating these error states, and the estimate is weighted according to the confidence in each data source. Typically, this is based on the random noise of each input and some a priori estimates of the stability of the sensors, which is used to determine a weighting for estimation for the various error states in the filter.

The process performed by the comparison filter 29 is illustrated in more detail in FIGS. 4 and 5.

The comparison filter 29 takes the power spectral density (PSD) of the FFT 28 (as shown in FIG. 4(*a*)) and establishes a simplified version of this by using frequency bins (shown in FIG. 4(*b*)) and determining the mean power level in each bin (shown in FIG. 4(*c*)). This calculation is then repeated at a later time (shown in FIGS. 5(*a*)-(*c*)) and the changes in mean power level for each bin determined. The level of change observed across all bins is provided as a suitable statistical result, such as a root mean square (RMS), with appropriate filtering in time to smooth the result. The output is then converted, at the PCI estimator 30, into a PCI through pre-determined thresholds for the chosen application. In some examples, the PCI is a value in the range from 0-1, where 0 means that a KF in the host system has zero confidence in the determined sensor parameters and 1 means that the KF has high confidence in the determined sensor parameters.

The invention claimed is:

1. A method of determining whether parametric performance of an inertial sensor has been degraded comprising:
   recording first data output from an inertial sensor; then
   recording second data output from the inertial sensor;
   comparing the first data output with the second data output; and
   determining whether the parametric performance of the inertial sensor has been degraded based on the comparison between the first and second data output;
   wherein the first and second data output are in the form of first and second frequency profiles, respectively; and
   wherein the frequency profiles used in the comparison include a windowed filter in time.

2. A method as claimed in claim 1, wherein the inertial sensor is an accelerometer or a gyro.

3. A method as claimed in claim 1, further comprising comparing data output from more than one inertial sensor.

4. A method as claimed in claim 1, wherein more than two frequency profiles from the same inertial sensor are compared.

5. A method as claimed in claim 1, wherein the frequency profiles used in the comparison include a windowed filter in time.

6. A method as claimed in claim 1, wherein the frequency profile is provided after high frequency sampling has been performed on the data output from the inertial sensor.

7. A method as claimed in claim 1, further comprising performing spectral analysis on the frequency profiles before they are compared.

8. A method as claimed in claim 7, wherein performing spectral analysis comprises performing a fast Fourier transform on the frequency profiles.

9. A method as claimed in claim 1, further comprising binning the frequency profiles before the frequency profiles are compared.

10. A method as claimed in claim 1, further comprising determining a parametric confidence indicator based on the result of the comparison.

11. A method as claimed in claim 10, wherein:
    the value of the parametric confidence indicator is determined based on the comparison and a predetermined threshold or set of thresholds; or
    a conversion function is used to convert the result of the comparison into a parametric confidence indicator.

12. An inertial measurement unit comprising:
    at least one inertial sensor; and
    processing means arranged to perform the method of claim 1.

13. An inertial measurement unit as claimed in claim 12, the inertial measurement unit comprising a comparison filter which is arranged to perform the step of comparing the sensor data output.

14. An inertial measurement unit as claimed in claim 12, the inertial measurement unit being arranged to output a value representing the result of the comparison to a host system computer.

15. A method of determining whether parametric performance of an inertial sensor has been degraded comprising:
    recording first data output from an inertial sensor; then
    recording second data output from the inertial sensor;
    comparing the first data output with the second data output; and
    determining whether the parametric performance of the inertial sensor has been degraded based on the comparison between the first and second data output;
    wherein the first and second data output are in the form of first and second frequency profiles, respectively; and
    wherein the method further comprises:
    performing spectral analysis on the frequency profiles before they are compared.

16. The method as claimed in claim 15, wherein performing spectral analysis comprises performing a fast Fourier transform on the frequency profiles.

17. The method as claimed in claim 15, further comprising binning the frequency profiles before the frequency profiles are compared.

18. The method as claimed in claim 15, further comprising determining a parametric confidence indicator based on the result of the comparison.

19. A method of determining whether parametric performance of an inertial sensor has been degraded comprising:
   recording first data output from an inertial sensor; then
   recording second data output from the inertial sensor;
   comparing the first data output with the second data output; and
   determining whether the parametric performance of the inertial sensor has been degraded based on the comparison between the first and second data output;
   wherein the first and second data output are in the form of first and second frequency profiles, respectively; and
   wherein the method further comprises:
   determining a parametric confidence indicator based on the result of the comparison.

20. The method as claimed in claim 19, wherein:
   the value of the parametric confidence indicator is determined based on the comparison and a predetermined threshold or set of thresholds; or
   a conversion function is used to convert the result of the comparison into a parametric confidence indicator.

* * * * *